(12) United States Patent
Gopinath et al.

(10) Patent No.: US 8,098,282 B2
(45) Date of Patent: Jan. 17, 2012

(54) PRIVACY ZONE ALGORITHM FOR PTZ DOME CAMERAS

(75) Inventors: Manoj Gopinath, Bangalore (IN); Arathi Mariswamy, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1221 days.

(21) Appl. No.: 11/777,821

(22) Filed: Jul. 13, 2007

(65) Prior Publication Data

US 2009/0015670 A1    Jan. 15, 2009

(51) Int. Cl.
*H04N 7/18* (2006.01)
(52) U.S. Cl. ........ 348/143; 348/144; 348/145; 348/146; 348/147; 348/148; 348/149; 348/150; 348/151; 348/152; 348/153; 348/154; 348/155; 348/156; 348/157; 348/158; 348/159; 348/160; 348/161; 348/162; 348/163; 348/164; 348/165; 348/166; 348/167; 348/168
(58) Field of Classification Search ........... 348/143–169
See application file for complete search history.

(56) References Cited

U.S. PATENT DOCUMENTS

| | | | |
|---|---|---|---|
| 2004/0119819 A1* | 6/2004 | Aggarwal et al. | 348/143 |
| 2005/0270371 A1* | 12/2005 | Sablak | 348/143 |
| 2006/0192853 A1 | 8/2006 | Lee | |
| 2007/0115356 A1* | 5/2007 | Kang et al. | 348/143 |

* cited by examiner

*Primary Examiner* — Wing Chan
*Assistant Examiner* — Hitesh Patel
(74) *Attorney, Agent, or Firm* — Husch Blackwell

(57) ABSTRACT

The present invention advantageously provides a means by which the privacy zone on a PTZ camera can be maintained so that an object in the camera's sight is always masked or covered. An algorithm which remembers the defined privacy zones as an area in space marked by four rays touching the four corners of the marked zone and having absolute Pan, Tilt angular coordinates is presented. The privacy zone is initially defined by a rectangle on the screen with known pixel coordinates which are translated into angular coordinates. Then, when the camera moves and prepares to display a new screen, the privacy zone is superimposed on the object to be masked. Locating the object and displaying its privacy zone is done by translating the absolute angular coordinates of the original privacy zone into pixel coordinates. Additionally, multiple privacy zones can be displayed on one camera screen.

17 Claims, 8 Drawing Sheets

US 8,098,282 B2

PRIVACY ZONE ALGORITHM FOR PTZ DOME CAMERAS

FIELD OF THE INVENTION

This invention relates generally to Pan Tilt Zoom (PTZ) dome cameras. In particular, this invention relates to defining and maintaining the privacy zone on a PTZ dome camera.

BACKGROUND OF THE INVENTION

Pan Tilt Zoom (PTZ) dome cameras rotate, tilt and zoom during operation to provide surveillance of an area. These PTZ cameras provide images which are displayed on a screen or monitor or other display device. When the camera is operating, there is often a need to mask "privacy zones", or specific areas or objects within the field of view of the camera. For example, in a hotel lobby, the privacy zone could include objects such as a swimming pool, or dressing or changing rooms.

During the operation of the PTZ camera, its rotating and zooming features make an object appear to "move" across the screen or display device as the area displayed by the camera changes. Thus the object (or objects) to be masked "moves across the screen" as the camera performs the pan, tilt operation, and the object also "enlarges and/or diminishes" as the zoom operates. FIG. 1 shows a prior art scenario when the tilt angle of the camera is zero. The object to be hidden and the privacy zone both appear to move horizontally across the screen at this low tilt angle. However, at higher tilt angles, generally greater than 45 degrees, the object appears to move in an arc across and down the screen. FIG. 2 shows the prior art scenario when the tilt angle of the camera is 70 degrees. Here the privacy zone still moves horizontally across the screen but the object appears to move in an arc. Thus the object is not continuously masked by the privacy zone, as it is when a low tilt angle is used.

The known PTZ dome and camera combinations in the market today do not work well for privacy zones when the dome camera is operating at higher tilt angles. Due to the geometry of PTZ camera rotation, at higher tilt angles, real objects do not move horizontally across the screen as at lower angles, but rather they follow a curved path. For example, the Honeywell KD6i dome does not address this problem and when using a Sony camera with the KD6i dome, the entire video screen goes blank if any portion, even a tip, of the defined privacy zone overlaps with the new or next camera screen displayed. The overlap leads to sudden screen blanking with complete loss of video, and the user tends to get lost and confused while moving the joystick as he or she has no idea where the camera is looking since he sees only a completely blank monitor screen.

Similarly, the Orbiter Dome of Honeywell and domes of many other manufacturers do not properly account for privacy zones at higher tilt angles due to the above problem. At present, there is no simple equation or solution executable by low end processors without floating point support to achieve the update rates required in real time to correct the above problem. Accordingly, a system and method is needed to maintain the privacy zone so that the object is always masked under the various pan/tilt/zoom conditions of the camera.

SUMMARY OF THE INVENTION

The present invention advantageously provides a means by which the privacy zone on a PTZ camera can be maintained so that an object in the camera's sight is always masked or covered.

The algorithm developed to solve this problem is based on geometry which aims to remember the defined privacy zones as an area in space marked by four rays touching the four corners of the marked zone and having absolute Pan, Tilt angular coordinates. The privacy zone is initially defined by a rectangle on the screen with known pixel co-ordinates. To remember the privacy zone in terms of absolute angular coordinates, the screen pixel coordinates are translated into angular coordinates. Then, when the camera moves and prepares to display a new screen, the object to be masked is located on this new screen. Locating the object and displaying its privacy zone is done by translating the absolute angular coordinates of the original privacy zone into pixel coordinates.

Additionally, multiple privacy zones can be displayed on one camera screen. An algorithm for performing the display of multiple privacy zones, as well as for predicting camera movement is also presented.

The foregoing and other objects, aspects, features, advantages of the invention will become more apparent from the following description and from the claims.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

An inventive solution to the problem of defining and maintaining a privacy zone for a PTZ dome camera is presented. The video display or screen of the camera has four sets of absolute angular coordinates, one set defining each of the screen's corners. To mask an object on the camera's video display and have the object remain hidden when the camera Pans, Tilts and Zooms, one can establish a privacy zone or rectangle having adjustable height and width so that it will cover the object which is to remain hidden. Initially, the privacy zone can be defined by putting a rectangular patch on the screen. The four corners of the rectangular patch have pixel co-ordinates on the screen. The privacy zone algorithm converts the pixel co-ordinates to angular co-ordinates. Once the privacy zone is defined, the camera is free to move, i.e., rotate in Pan and Tilt and also Zoom action.

For each new screen or video display produced by the camera's movement at any point in time, it is necessary to know the angular co-ordinates of the object to be masked and, if the object is in the video display, it is necessary to create a new privacy zone by redrawing a masked area or blanking rectangle/quadrilateral over this object. To create the new privacy zone, the pixel coordinates locating this new zone on the new screen, yet corresponding to the earlier defined privacy zone, must be determined. Thus, the absolute angular coordinates of the earlier defined privacy zone must be converted into pixel coordinates for the new screen, and then the masked area can be redrawn.

It may happen that the previously defined 3D privacy zone space may have complete overlap, partial overlap or no overlap with the current screen display. In the first two cases, the masked area will be shown on the screen, and in the last event, the current screen will not have the privacy zone.

Figure 1:
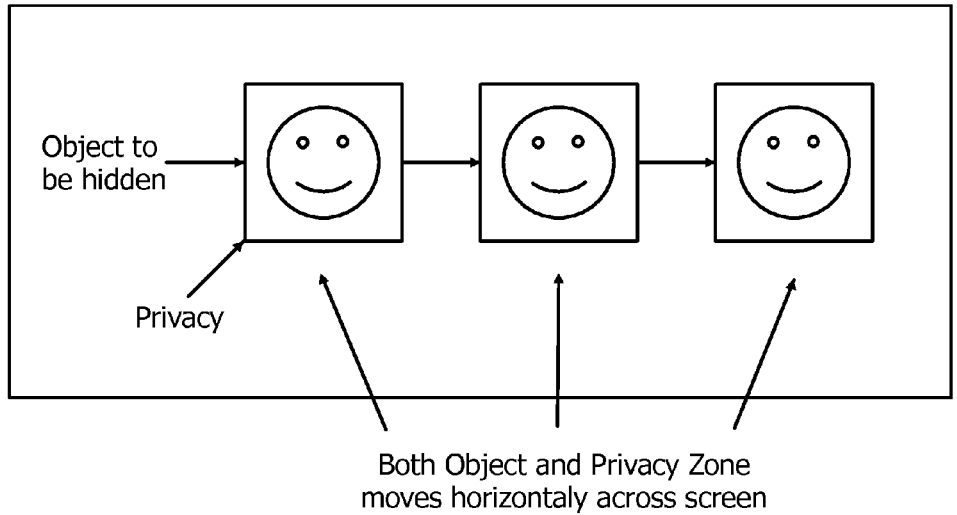
FIG. 1 is a schematic of the prior art when the camera angle is zero.
Figure 2:
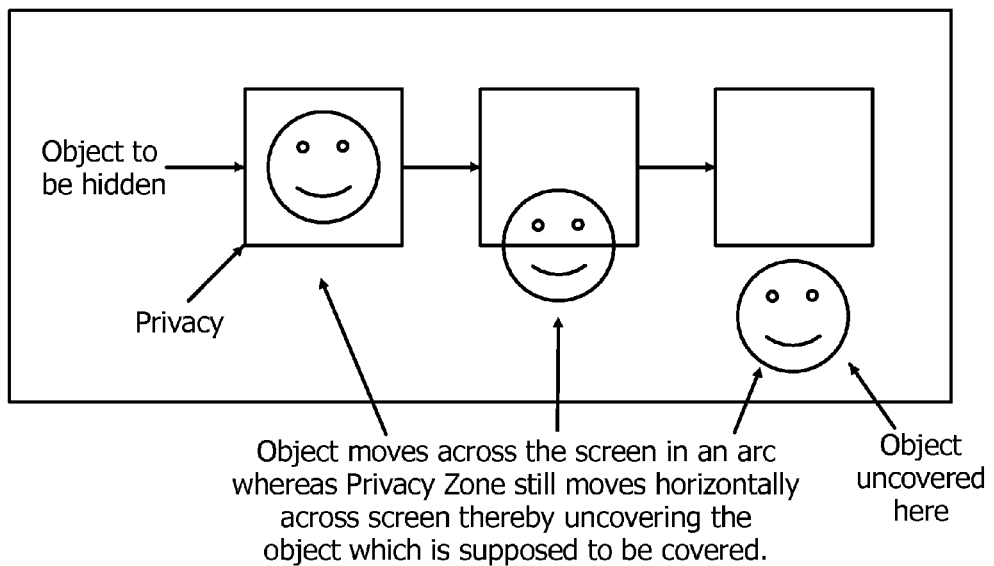
FIG. 2 is a schematic of the prior art when the camera angle is 70 degrees.
Figure 3:
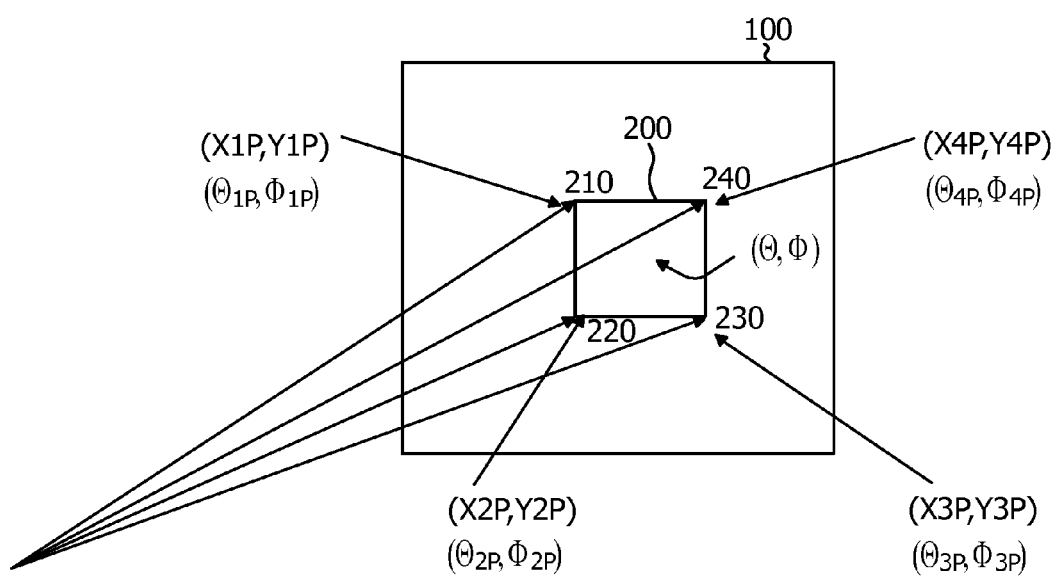
FIG. 3 shows the Absolute Angular Coordinates of a privacy zone.

FIG. 3 shows the Pixel and Angular co-ordinates of the four corners of a privacy zone. The Pan angle ($\Theta$) is the azimuth angle of the camera optic axis, the Tilt angle ($\Phi$) is the elevation angle of camera optic axis, with respect to the ground plane. The Zoom position defines the Horizontal field of view ($H_{FOV}$).

To find the privacy zone, it is necessary to determine the absolute angular coordinates of each corner ($\Theta_{1P}, \Phi_{1P}$), ($\Theta_{2P}, \Phi_{2P}$), ($\Theta_{3P}, \Phi_{3P}$), ($\Theta_{4P}, \Phi_{4P}$) in degrees corresponding to the above four pixel (X,Y) coordinates which indicate the four corners of the privacy zone. Accordingly, a function which can translate any pixel position X1, Y1 on the screen to absolute angular coordinates ($\Theta_{1P}, \Phi_{1P}$) is needed, such that ($\Theta_{1P}, \Phi_{1P}$)=Function (Pan Angle, Tilt Angle, Zoom Position, X1,Y1).

Once the privacy zone is established, the PTZ dome camera can perform Pan, Tilt, and Zoom operations and the camera can change from the current position, such that a new screen is displayed. For the new screen, at any instant of time, the known information is the Pan angle, Tilt angle and the Zoom position. When the new screen is displayed, the privacy zone must be redrawn on it. Therefore, it becomes necessary to determine, on the new screen, the four pixel coordinates (X1, Y1), (X2,Y2), (X3,Y3), (X4,Y4) corresponding to the absolute angular coordinates ($\Theta_{1P}, \Phi_{1P}$), ($\Theta_{2P}, \Phi_{2P}$), ($\Theta_{3P}, \Phi_{3P}$), ($\Theta_{4P}, \Phi_{4P}$) of the four corners of the privacy zone. Accordingly, an inverse function which can translate any absolute angular coordinates ($\Theta_{1P}, \Phi_{1P}$) to the corresponding pixel position X1,Y1 on the screen is needed, such that:

(X1,Y1)=Inverse Function(Pan Angle,Tilt Angle,Zoom Position,$\Theta_{1P},\Phi_{1P}$).

Figure 4:
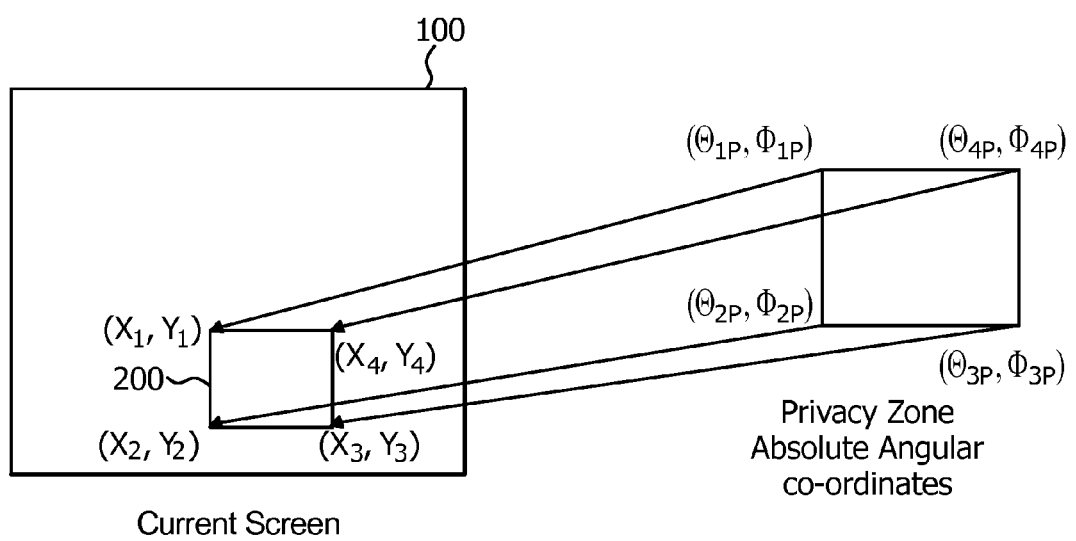
FIG. 4 shows the mapping of Angular Coordinates to Pixel Coordinates.

FIG. 4 illustrates translating the privacy angular coordinates ($\Theta_{1P}, \Phi_{1P}$), ($\Theta_{2P}, \Phi_{2P}$), ($\Theta_{3P}, \Phi_{3P}$), ($\Theta_{4P}, \Phi_{4P}$) of the four corners of the privacy zone to pixel coordinates (X1,Y1), (X2,Y2), (X3,Y3), (X4,Y4). However, it is possible that the new screen may not contain one or more of the four corners or points, depending on the camera orientation (i.e. how far the camera sight has moved) with respect to the original privacy zone location.

Details of the geometric calculations and the derivation of the exact relation from camera geometry follow. A derivation of the pixel to absolute angular coordinates function is presented, and then a derivation of the inverse, absolute angular to pixel coordinates, function is provided.

Figure 5:
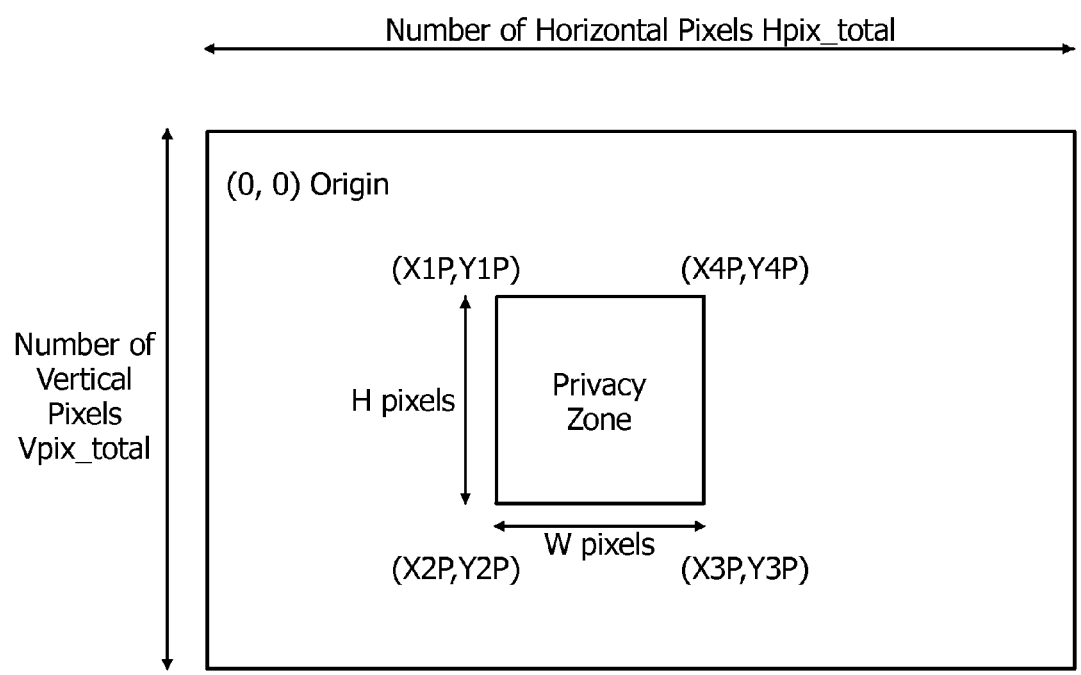
FIG. 5 shows the X, Y coordinate mapping of a screen in terms of pixels.

FIG. 5 shows a video screen containing a privacy zone or box with height "H" pixels and width "W" pixels. The total number of horizontal pixels are shown as Hpix_total and the total number of vertical pixels are shown as Vpix_total. The pixel coordinates (X1P,Y1P), (X2P,Y2P), (X3P,Y3P), (X4P, Y4P) of the privacy zone are calculated as follows.

$$X1P = X2P = H\text{pix\_total}/2 - W/2$$

$$X4P = X3P = H\text{pix\_total}/2 + W/2$$

$$Y1P = Y4P = V\text{pix\_total}/2 - H/2$$

$$Y2P = Y3P = V\text{pix\_total}/2 + H/2$$

Figure 6:
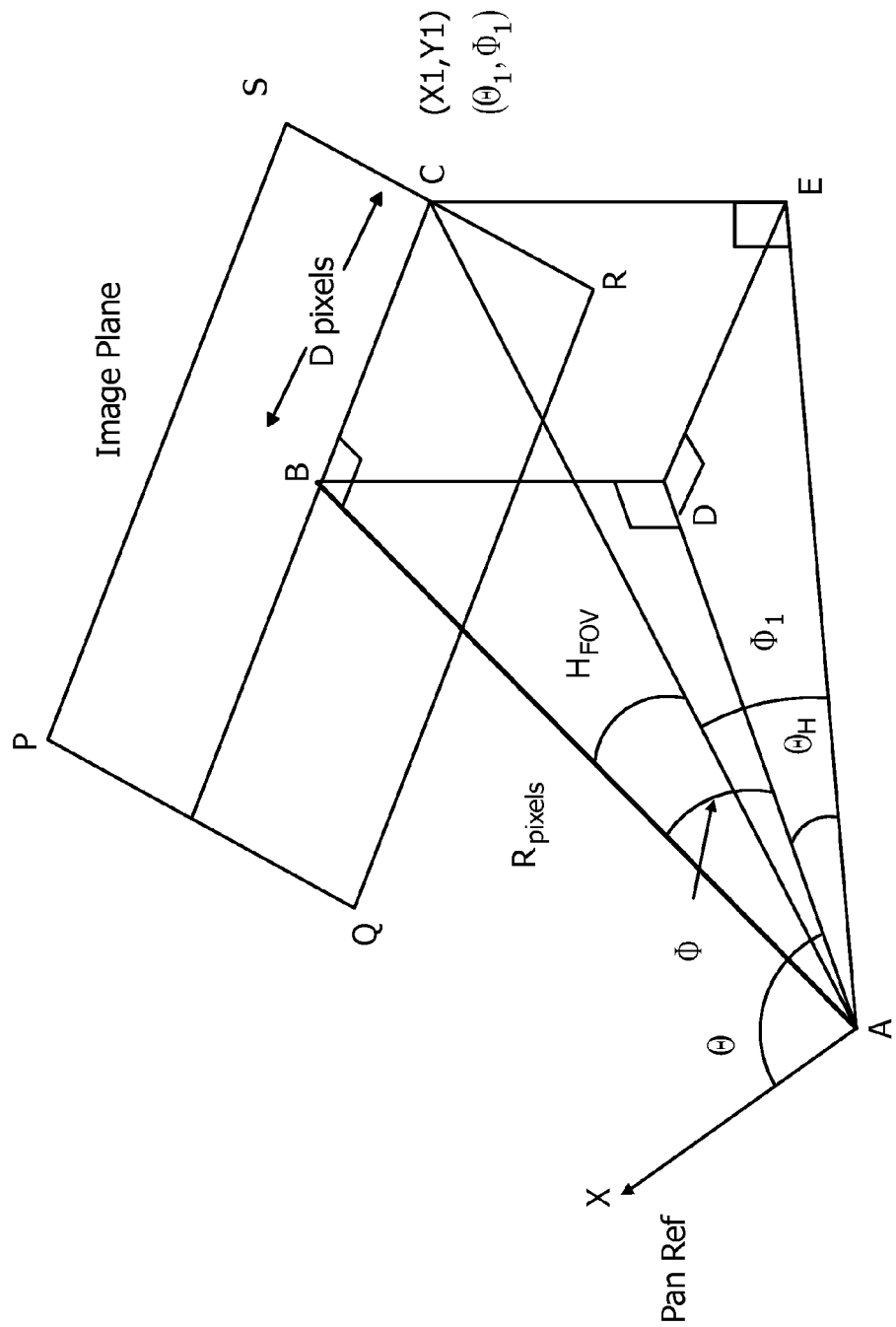
FIG. 6 is a 3D view of an image plane from Camera Focal Point.

After determining the pixel coordinates, translating from pixel (X,Y) coordinates to absolute angular coordinates ($\Theta_1, \Phi_1$) is undertaken. FIG. 6 shows a 3D view of Image Plane from Camera Focal Point. In FIG. 6, PQRS 610 is the image plane. AB 620 is a line drawn from the focal point 600 to the center 630 of the image plane 610. Point C 640 is at the right middle end of the image plane. Lines 650, 660 are the perpendicular projection of points B 630, C 640 on the horizontal plane 670. Angle BAC 680 is the horizontal field of view, $H_{FOV}$. By definition, Tilt angle $\Phi$ for any point is the angle it makes with the vertical plane, and Pan angle $\Theta$ is found by dropping a perpendicular line to the horizontal plane and finding the angle the projection makes with the Pan Reference direction. In FIG. 6, point B 630 is the center of the image plane and it has coordinates ($\Theta, \Phi$), i.e. the pan angle and tilt angle of the camera. Further, FIG. 6 shows angle BAD, i.e., Tilt angle $\Phi$, and angle XAD, i.e., Pan angle $\Theta$. For point C 640, FIG. 6 shows angle CAE, i.e., Tilt angle $\Phi_1$, and angle XAE, i.e., Pan angle $\Theta_1$, and illustrates that angle XAD+ angle DAE=$\Theta+\Theta_H$.

As discussed above, the known parameters are pan angle, tilt angle ($\Theta, \Phi$), the horizontal field of view ($H_{FOV}$), and the number of pixels away from center Dpixels (which is determined from the pixel coordinates). It is also known that:
in the right angle triangle ABC, $$\text{Sin } H_{FOV} = BC/AC = D\text{pixels}/AC \quad (1)$$

$$\text{Cos } H_{FOV} = AB/AC = R \text{ pixels}/AC \quad (2)$$

in the right angle triangle BDA, $$\text{Sin } \Phi = BD/AB = BD/R \text{ pixels} \quad (3)$$

and,
in the right angle triangle AEC, $$\text{Sin } \Phi_1 = CE/AC. \quad (4)$$

Since CE=BD, we have Sin $\Phi_1$=BD/AC (substituting from (4)).

Thus, Sin $\Phi_1$=BD/AC=(R pixels Sin $\Phi$)/AC (substituting from (3))
=(R pixels/AC) Sin $\Phi$
=(Cos $H_{FOV}$) Sin $\Phi$ (substituting from (2)).
Thus, Sin $\Phi_1$=Cos $H_{FOV}$ Sin $\Phi$ and $$\Phi_1 = \text{Sin inv}(\text{Cos } H_{FOV} \text{Sin } \Phi) \quad (5)$$

Next it is necessary to find $\Theta_1$, as follows:
$\Theta_1 = \Theta + \Theta_H$, where $\Theta$ is known.
To determine $\Theta_H$,
in the right angle triangle ADE,
DE=BC=Dpixels, so that:

$$\text{Sin } \Theta_H = DE/AE = BC/AE = D\text{pixels}/AE. \quad (6)$$

In the right angle triangle AEC, $$\text{Cos } \Phi_1 = AE/AC$$

$$AE = AC \text{ Cos } \Phi_1. \quad (7)$$

In right angle triangle ABC, $$D\text{pixels}/AC = \text{Sin } H_{FOV} \text{ or } AC = D\text{pixels}/\text{Sin } H_{FOV}$$

Thus, AE=(Dpixels/Sin $H_{FOV}$) Cos $\Phi_1$ (substituting from (7))

Further, substituting for AE in (6), $$\text{Sin } \Theta_H = D\text{pixels}/AE = D\text{pixels}/((D\text{pixels/Sin } H_{FOV})\text{Cos } \Phi_1) \text{ or} \quad (5)$$

$$\text{Sin } \Theta_H = \text{Sin } H_{FOV}/\text{Cos } \Phi_1$$

So that: $\Theta_H$=Sin inv(Sin $H_{FOV}$/Cos $\Phi_1$) (8)

Recalling that $\Theta_1 = \Theta + \Theta_H$, we have $$\Theta_1 = \Theta + \text{Sin inv}(\text{Sin } H_{FOV}/\text{Cos } \Phi_1)(\text{substituting from (8)}). \quad (9)$$

Rewriting equation (5), we have:

$$\Phi_1 = \text{Sin inv}(\text{Cos } H_{FOV} \text{ Sin } \Phi) \quad (5)$$

Equations (9) and (5) above show the relationship of the angular coordinates ($\Theta_1$, $\Phi_1$) of the point C in terms of known parameters ($\Theta$, $\Phi$), i.e. the Pan angle and Tilt angle of the camera, and the Horizontal field of view $H_{FOV}$. The above relationship is for the point C on the Horizontal end point of the field of view.

Figure 7:
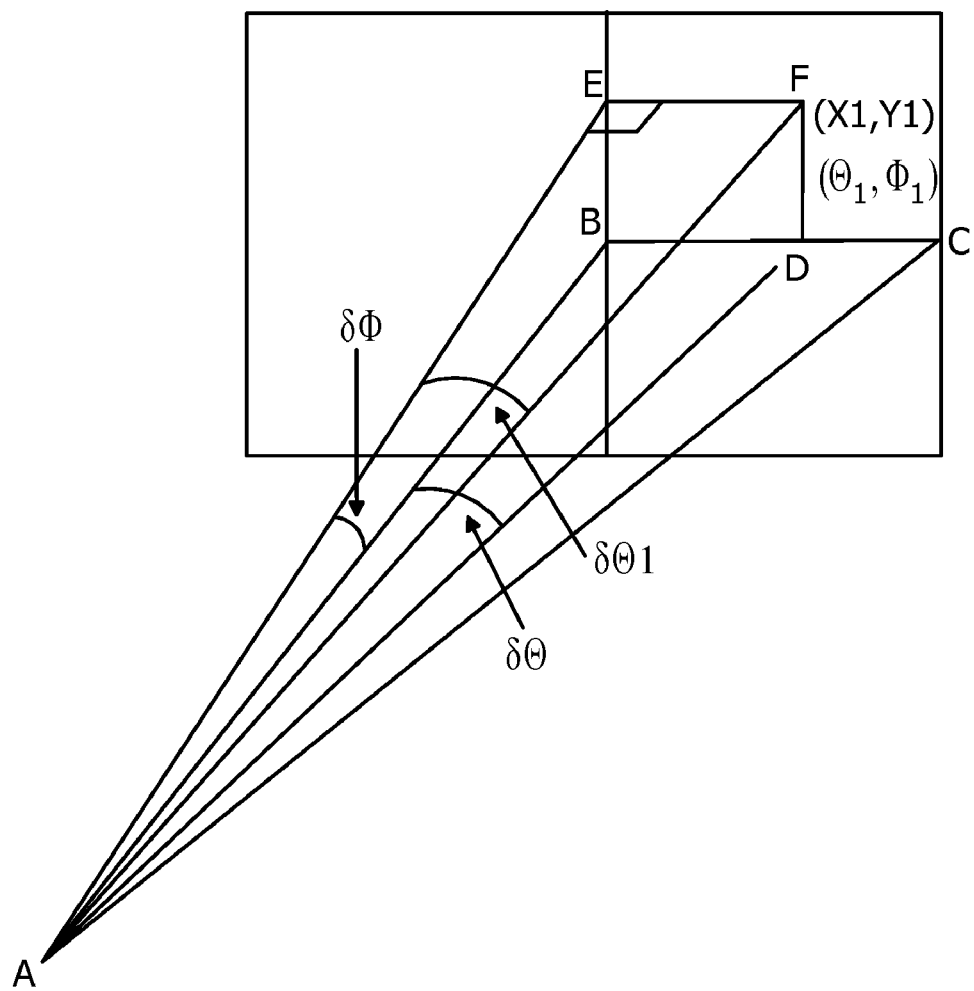
FIG. 7 shows an arbitrary point (X1,Y1) on the image plane with Pan, Tilt angles.

The above equations can be extended to find the angular coordinates ($\Theta_1$, $\Phi_1$) for any arbitrary pixel (X,Y) on the image plane. FIG. 7 shows an image plane with an arbitrary point (X1,Y1) on the image plane for which we need to find the angular coordinates ($\Theta_1$, $\Phi_1$). As shown, the tilt angle $\Phi$ at the center gets replaced by $\Phi+\delta\Phi$ where $\delta\Phi$ is the incremental angle from center to reflect that the pixel is at Y1 distance from the center. Angle BAC, which was equal to $H_{FOV}$ as shown in FIG. 6, is replaced by the angle EAF or $\delta\Theta_1$.

Figure 8:
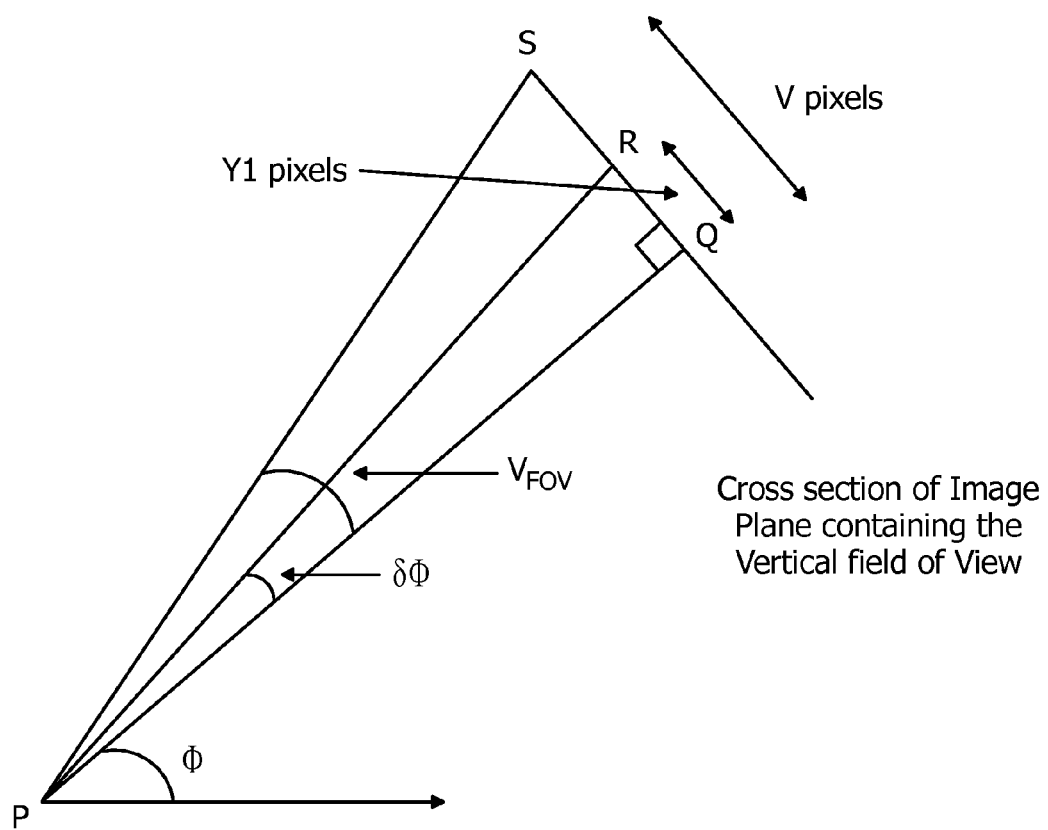
FIG. 8 is a cross section of the image plane showing the image plane as a single line.

Thus it is necessary to find $\delta\Phi$ and $\delta\Theta_1$. FIG. 8 shows a perpendicular line PQ 710 drawn from the focal point P 700 to the center of the image plane Q 720. SQ 730 is the pixels along the vertical field of view $V_{FOV}$ 740. By definition:

$V_{FOV}$=Aspect ratio*$H_{FOV}$, where aspect ratio is 3:4 or 0.75.

In triangles PQR and PQS, $$\text{Tan } \delta\Phi = QR/PQ = Y1 \text{ pixels}/PQ \text{ and} \quad (10)$$

$$\text{Tan } V_{FOV} = QS/PQ = V\text{pixels}/PQ \quad (11)$$

where Vpixels is half the total vertical pixels, eg. Vpixels=240/2=120 pixels for a 400×240 pixel screen.

Dividing equation (10) by (11), we have:

$$\text{Tan } \delta\Phi/\text{Tan } V_{FOV} = Y1 \text{ pixels}/V\text{pixels},$$

$$\text{Tan } \delta\Phi = \text{Tan } V_{FOV}*(Y1 \text{ pixels}/V\text{pixels}), \text{ and solving for } \delta\Phi, \text{ yields:}$$

$$\delta\Phi = \text{Tan inv}(\text{Tan } V_{FOV}*(Y1 \text{ pixels}/V\text{pixels})) \quad (12)$$

Similarly $\delta\Theta$ is related to the Hpixels, $H_{FOV}$ and the X1 distance from center, so that:

$$\delta\Theta = \text{Tan inv}(\text{Tan } H_{FOV}*(X1 \text{ pixels}/H\text{pixels})) \quad (13)$$

where Hpixels is half the total horizontal pixels, eg. Hpixels=400/2=200 pixels for a 400×240 pixel screen.

Referring again to FIG. 7, for small distances from the vertical axis or small $\delta\Phi$, the angles $\delta\Theta$ and $\delta\Theta_1$ are nearly equal. Thus, further geometric calculations can be derived as follows:

In Triangle AEF, (14)

$$\text{Tan}\delta\Theta_1 = EF/AE$$

In Triangle ABD, $$\text{Tan}\delta\Theta = BD/AB$$

$$\text{Cos}\delta\Phi = AB/AE$$

$$\text{Tan}\delta\Theta_1 = EF/AE.$$

Since $EF = BD$, $$\text{Tan}\delta\Theta_1 = BD/AE$$
$$= BD/AB * AB/AE$$
$$= \text{Cos}\delta\Phi * \text{Tan}\delta\Theta,$$

and $$\delta\Theta_1 = \text{Tan}inv(\text{Cos}\delta\Phi * \text{Tan}\delta\Theta)$$

Finally the modified equations (5) and (9) become:

$$\Theta_1 = \Theta + \Theta_H = \Theta + \text{Sin inv}(\text{Sin } \delta\Theta_1/\text{Cos } \Phi_1) \quad (15)$$

$$\Phi_1 = \text{Sin inv}(\text{Cos } \delta\Theta_1 \text{ Sin}(\Phi+\delta\Phi)) \quad (16)$$

The above equations (13, 14) can be used to find the four absolute angular positions of the defined privacy zone when it is fixed. Each pair of pixel coordinates is accordingly transformed to absolute angular coordinates, such that:

$$(X1P,Y1P) \rightarrow (\Theta_{1P}, \Phi_{1P}).$$

$$(X2P,Y2P) \rightarrow (\Theta_{2P}, \Phi_{2P}).$$

$$(X3P,Y3P) \rightarrow (\Theta_{3P}, \Phi_{3P}).$$

$$(X4P,Y4P) \rightarrow (\Theta_{4P}, \Phi_{4P}).$$

Once the privacy zone is established, as the camera moves and performs pan, tilt and/or zoom, the privacy zone can be redrawn on the "new" screen, that is, the screen displayed after the camera moves. At this time, the privacy zone angular coordinates are known. The location or position of these angular coordinates on the new screen must be found and the privacy zone redrawn, that is, the pixel coordinates corresponding to the angular positions must be determined. Accordingly, the inverse function that can translate any absolute angular coordinates ($\Theta_{1P}$, $\Phi_{1P}$) to the corresponding pixel position X1,Y1 on the screen is derived below.

Since it is known that $\Theta_1 = \Theta + \Theta_H$, $\Theta_H = \Theta_1 - \Theta$ (subtracting Pan Angle $\Theta$ from $\Theta_1$ to get $\Theta_H$).

Sin $\Theta_H$=Sin $\delta\Theta_1$/Cos $\Phi_1$ (substituting from equation (15)), so that $$\delta\Theta_1 = \text{Sin inv}(\text{Sin } \Theta_H * \text{Cos } \Phi_1) \quad (17)$$

From Equation (13) we can derive that:

$$X1 \text{ pixel Distance} = H\text{pixels}*(\text{Tan } \delta\Theta/\text{Tan } H_{FOV})$$

$$X1 \text{ pixel} = X1 \text{ pixel Distance} + X \text{ center offset} \quad (18)$$

Since $\Phi_1$=Sin inv(Cos $\delta\Theta_1$ Sin($\Phi+\delta\Phi$)) as per equation (16)

$\Phi_1$ is known which is the elevation angle of the point $$\text{Sin}(\Phi+\delta\Phi) = \text{Sin } \Phi_1/\text{Cos } \delta\Theta_1$$

$$(\Phi+\delta\Phi) = \text{Sin inv}(\text{Sin } \Phi_1/\text{Cos } \delta\Theta_1)$$

$\Phi$, the current Tilt angle, is also known.

$$\delta\Phi = \text{Sin inv}(\text{Sin } \Phi_1/\text{Cos } \delta\Theta_1) - \Phi \quad (19)$$

Similarly, using equation (12) we derive:

Y1 pixel Distance=Vpixels*(Tan δΦ/Tan $V_{FOV}$)

Y1 pixel=Y1 pixel Distance+Y center offset (20)

The above equations (18, 20) can be used to find the four pixel coordinates of the defined privacy zone when it is fixed. Each pair of absolute angular coordinates is accordingly transformed to pixel coordinates, such that:

$(\Theta_{1P}\Phi_{1P}) \to (X1P, Y1P)$ $(\Theta_{2P}\Phi_{2P}) \to (X2P, Y2P)$ $(\Theta_{3P}\Phi_{3P}) \to (X3P, Y3P)$ $(\Theta_{4P}\Phi_{4P}) \to (X4P, Y4P).$ Thus equations 13, 14, 18 and 20 can be used to determine the appropriate location or position of the privacy zone so that a masked area remains masked regardless of the operation of the PTZ dome camera. Using these formulas, in a preferred embodiment, the privacy zone can be updated up to twenty times a second (50 msec).

One embodiment of the present invention can be implemented using NOD (Next Generation Dome) firmware which is able to define thirty two privacy zones simultaneously, and to display a maximum of eight privacy zones on the screen. If more than eight privacy zones are active, eight are selected to be displayed based on priority. The embodiment can operate with a Honeywell NGD Dome which is a high speed dome capable of movement of 480 degrees per second and acceleration of 3840 degrees per second, which translate to a 360 degree angular rotation in less than one second. Accordingly, the privacy zone updates have to be carried out sufficiently quickly, enabling the masking rectangle/quadrilateral to keep track of the object to be covered and not lag behind at any speed. Motion prediction, and zoom prediction can be used to counter the effect of fast movement and zoom. The following steps outline how multiple privacy zones are to be updated in real time in the processor.

In Step 1, at the start of the process, translate the four corners of the current screen to angular coordinates, knowing the present Zoom, Pan, Tilt values. The angular resolution used can be of $\frac{1}{200}^{th}$ of a degree, i.e., each count corresponds to 0.005 degrees.

In Step 2, check each privacy zone to see if it has any overlap with the screen, such that the privacy zone should be displayed on the screen. If there is an overlap of a particular privacy zone, set the hit_flag of this privacy zone to TRUE.

Figure 9:
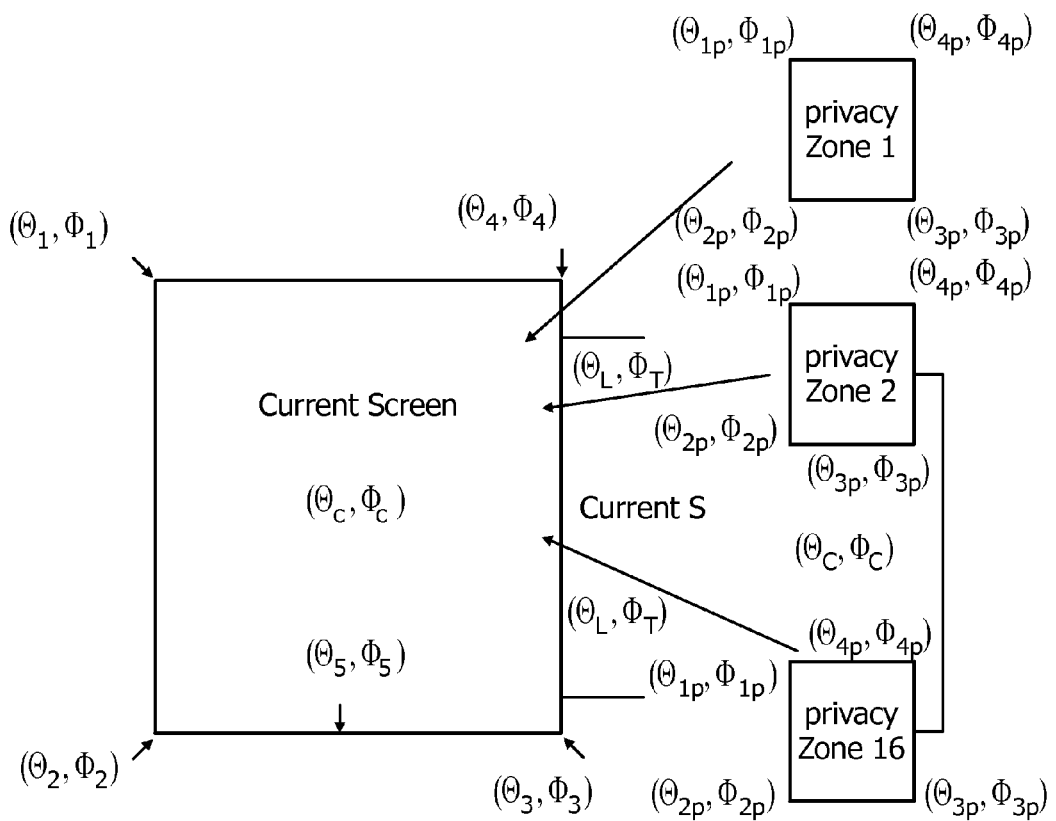
FIG. 9 shows how to find Limits of current screen in terms of absolute angular coordinates.

To perform this check, for each of the four corner points of each privacy zone, check if the point falls within the current screen. As shown in FIG. 9, there is a gradient across the screen with the screen bottom having wider Pan angles compared to screen top, i.e., $\Theta_2$ to $\Theta_3$ will be the largest gradient in $\Theta$. Similarly, the Tilt angle also has a gradient over the screen with the largest gradient being found over $\Phi_1$ to $\Phi_5$ range.

To determine whether a privacy zone overlaps with the current screen, it is sufficient to perform the following comparisons.

1) Determine whether $\Theta_2 <= \Theta_{1p}$ to $\Theta_{4p} <= \Theta_3$, i.e., check to see if any of $\Theta_{1p}$ to $\Theta_{4p}$ falls in the interval between $\Theta_2$ and $\Theta_3$. (Is(are) one or more corner point(s) between the screen bottom left and bottom right pan angles?)

2) Determine whether $\Phi_1 <= \Phi_{1p}$ to $\Phi_{4p} <= \Phi_5$, i.e., check to see if any of $\Phi_{1p}$ to $\Phi_{4p}$ falls in the interval between $\Phi_1$ and $\Phi_5$. (Is(are) one or more corner point(s) between the screen top left and bottom center tilt angles?)

If the above conditions for $\Theta$ and $\Phi$ are not met, i.e. the privacy zone $\Theta_{1p}$ to $\Theta_{4p}$ and $\Phi_{1p}$ to $\Phi_{4p}$ do not fall within the screen Pan or Tilt gradient limits, the privacy zone does not have overlap with the current screen, and the hit_flag is set to FALSE.

Otherwise it is possible that the privacy zone has overlap and the translation from angular coordinates to pixel coordinates needs to be done.

In Step 3, the number of privacy zones having overlap with the current screen is checked. If there are more than eight privacy zones having the hit_flag set to TRUE, then some must be removed as no more than eight privacy zones can be displayed on one screen. The privacy zones having lowest priority are removed by setting the hit_flag to FALSE until only eight privacy zones at any instant of time have the hit_flag equal to TRUE. Then only eight privacy zones will be drawn on the screen. The privacy zones which have hit_flag as TRUE are further considered and the ones with hit_flag as FALSE are not considered anymore for the current screen mapping of privacy zones.

In Step 4, the privacy zones are drawn using pixel maps (and pixel coordinates translated in Step 2). Rectangular fills of each zone is done.

The processing of the above steps is calculation intensive and needs finite time to complete. Further, at the end of the calculations, the camera likely has moved so that the screen pan, tilt, and/or zoom coordinates would have changed. So the calculated values will correspond to a screen that was active 20 millisecond earlier, which means there is a risk the calculated privacy zone could always lag slightly behind the actual object on the screen.

To correct this problem, compensation can be made for camera movement by predicting the pan and tilt positions at the end of the interval (for example, 20 millsec) in which the new privacy bit map will be updated, and using those predicted values for the privacy zone location calculations.

In one embodiment, the following motion equations can be used to do the prediction:

$$\omega_F = \omega_I + \alpha t$$

$$\theta = \frac{1}{2}(\omega_F + \omega_I)t$$

$$\theta = \omega_I t + \frac{1}{2}\alpha t^2$$

$$\omega_F^2 = \omega_I^2 + 2\alpha\theta$$

where angles are in radians/second, and velocity is in radian/second² and where:

α—Angular acceleration
ωI—initial angular velocity
ωF—Final angular velocity
θ—angular displacement
t—time interval (here 0.02 sec)

In addition, zoom movement compensation can be done using Zoom look up tables.

While the present invention has been described in particular embodiments, it should be appreciated that the present invention should not be construed as limited by such embodiments, but rather construed according to the below claims.

What is claimed is:

1. A method for maintaining a privacy zone on a PTZ dome camera, said method comprising:
locating an object to be masked on a camera display screen;
superimposing a known rectangle for masking the object, said rectangle having four corners, each corner having pixel coordinates;

translating each of the pixel coordinates into absolute angular coordinates;

moving the camera and displaying a second camera view/screen; and if the object is on the second camera view/screen, translating each of the absolute angular coordinates into pixel coordinates, creating a newly formed rectangle having the translated pixel coordinates, and displaying the newly formed rectangle to mask the object wherein translating pixel coordinates into absolute angular coordinates comprises:

$\delta\Phi = \text{Tan inv}(\text{Tan } V_{FOV}*(Y1 \text{ pixels}/V\text{pixels}))$ $\delta\Theta = \text{Tan inv}(\text{Tan } H_{FOV}*(X1 \text{ pixels}/H\text{pixels}))$ $\Theta_1 = \Theta + \text{Sin inv}(\text{Sin } \delta\Theta1/\text{Cos } \Phi_1)$ and $\Phi_1 = \text{Sin inv}(\text{Cos } \delta\Theta1 \text{ Sin}(\Phi + \delta\Phi))$, where $H_{FOV}$ = Horizontal Field of View $V_{FOV} = 0.75*H_{FOV}$ Vpixels = one half of the total number of vertical pixels Hpixels = one half of the total number of horizontal pixels $\Theta$ = azimuth angle of camera optic axis $\Phi$ = elevation angle of camera optic axis.

2. The method according to claim 1, wherein moving the camera comprises at least one of panning the camera, tilting the camera, and zooming the camera.

3. The method according to claim 1, wherein moving the camera comprises predicting at least one of pan position of the camera, and tilt position of the camera.

4. A method for maintaining and displaying more than one privacy zone on a PTZ dome camera screen having four corners, said method comprising:

for each privacy zone, determining a rectangle for masking an object, said rectangle having four corners, each corner having pixel coordinates, and translating the pixel coordinates into absolute angular coordinates;

translating the four corners of the camera screen to angular coordinates;

for each privacy zone, determining whether the privacy zone is on the camera screen, and if the privacy zone is on the camera screen, selecting no more than a number of maximum allowed privacy zones to be displayed; and for a number of privacy zones to be displayed, translating each of the absolute angular coordinates into pixel coordinates, creating a newly formed rectangle having the translated pixel coordinates, and displaying the newly formed rectangle to mask the object wherein translating pixel coordinates into absolute angular coordinates comprises:

$\delta\Phi = \text{Tan inv}(\text{Tan } V_{FOV}*(Y1 \text{ pixels}/V\text{pixels}))$ $\delta\Theta = \text{Tan inv}(\text{Tan } H_{FOV}*(X1 \text{ pixels}/H\text{pixels}))$ $\Theta_1 = \Theta + \text{Sin inv}(\text{Sin } \delta\Theta1/\text{Cos } \Phi_1)$ and $\Phi_1 = \text{Sin inv}(\text{Cos } \delta\Theta1 \text{ Sin}(\Phi + \delta\Phi))$, where $H_{FOV}$ = Horizontal Field of View $V_{FOV} = 0.75*H_{FOV}$ Vpixels = one half of the total number of vertical pixels Hpixels = one half of the total number of horizontal pixels $\Theta$ = azimuth angle of camera optic axis $\Phi$ = elevation angle of camera optic axis.

5. The method according to claim 4, wherein selecting is done based on a priority.

6. The method according to claim 1, wherein translating pixel coordinates into absolute angular coordinates is done using a function having parameters comprising at least Horizontal Field of View, vertical pixels, horizontal pixels, and angles of camera optic axis.

7. The method according to claim 1, wherein translating absolute angular coordinates into pixel coordinates is done using a function having parameters comprising at least Horizontal Field of View, vertical pixels, horizontal pixels, and angles of camera optic axis.

8. A method for maintaining a privacy zone on a PTZ dome camera, said method comprising:

locating an object to be masked on a camera display screen;

superimposing a known rectangle for masking the object, said rectangle having four corners, each corner having pixel coordinates;

translating each of the pixel coordinates into absolute angular coordinates;

moving the camera and displaying a second camera view/screen; and if the object is on the second camera view/screen, translating each of the absolute angular coordinates into pixel coordinates, creating a newly formed rectangle having the translated pixel coordinates, and displaying the newly formed rectangle to mask the object, wherein translating absolute angular coordinates into pixel coordinates is done using the formulas:

$X1 \text{ pixel} = (H\text{pixels}*(\text{Tan } \delta\Theta/\text{Tan } H_{FOV})) + X \text{ center offset}$ $Y1 \text{ pixel} = (V\text{pixels}*(\text{Tan } \delta\Phi/\text{Tan } V_{FOV})) + Y \text{ center offset}$, where $H_{FOV}$ = Horizontal Field of View $V_{FOV} = 0.75*H_{FOV}$ Vpixels = one half of the total number of vertical pixels Hpixels = one half of the total number of horizontal pixels $\Theta$ = azimuth angle of camera optic axis $\Phi$ = elevation angle of camera optic axis.

9. An article of manufacture comprising:

a non-transitory computer usable medium having computer readable program code means embodied thereon for maintaining a privacy zone on a PTZ dome camera, said computer readable program code means in said article of manufacture comprising:

computer readable program code for locating an object to be masked on a camera display screen;

computer readable program code for superimposing a known rectangle for masking the object, said rectangle having four corners, each corner having pixel coordinates;

computer readable program code for translating each of the pixel coordinates into absolute angular coordinates;

computer readable program code for moving the camera and displaying a second camera view screen; and if the object is on the second camera view screen, computer readable program code for translating each of the absolute angular coordinates into pixel coordinates, creating a newly formed rectangle having the translated pixel coordinates, and displaying the newly formed rectangle to mask the object, wherein translating pixel coordinates into absolute angular coordinates comprises:

$\delta\Phi = \text{Tan inv}(\text{Tan } V_{FOV}*(Y1 \text{ pixels}/V\text{pixels}))$ $\delta\Theta = \text{Tan inv}(\text{Tan } H_{FOV}*(X1 \text{ pixels}/H\text{pixels}))$ $\Theta_1 = \Theta + \text{Sin inv}(\text{Sin } \delta\Theta1/\text{Cos } \Phi_1)$ and $\Phi_1 = \text{Sin inv}(\text{Cos } \delta\Theta1 \text{ Sin}(\Phi + \delta\Phi))$, where $H_{FOV}$ = Horizontal Field of View $V_{FOV} = 0.75 * H_{FOV}$ Vpixels = one half of the total number of vertical pixels Hpixels = one half of the total number of horizontal pixels $\Theta$ = azimuth angle of camera optic axis $\Phi$ = elevation angle of camera optic axis.

10. The article as claimed in claim 9, wherein moving the camera comprises at least one of panning the camera, tilting the camera, and zooming the camera.

11. The article as claimed in claim 9, wherein moving the camera comprises predicting at least one of pan position of the camera, and tilt position of the camera.

12. An article of manufacture comprising:

a non-transitory computer usable medium having computer readable program code means embodied thereon for maintaining and displaying more than one privacy zone on a PTZ dome camera screen having four corners, said computer readable program code means in said article of manufacture comprising:

for each privacy zone, computer readable program code for determining a rectangle for masking an object, said rectangle having four corners, each corner having first pixel coordinates, and translating the first pixel coordinates into absolute angular coordinates;

computer readable program code for translating the four corners of the camera screen to angular coordinates;

for each privacy zone, computer readable program code for determining whether the privacy zone is on the camera screen, and if the privacy zone is on the camera screen, selecting no more than a number of maximum allowed privacy zones to be displayed; and for a number of privacy zones to be displayed, computer readable program code for translating each of the absolute angular coordinates into pixel coordinates, creating a newly foamed rectangle having the translated pixel coordinates, and displaying the newly formed rectangle to mask the object, wherein translating pixel coordinates into absolute angular coordinates comprises:

$\delta\Phi = \text{Tan inv}(\text{Tan } V_{FOV}*(Y1 \text{ pixels}/V\text{pixels}))$ $\delta\Theta = \text{Tan inv}(\text{Tan } H_{FOV}*(X1 \text{ pixels}/H\text{pixels}))$ $\Theta_1 = \Theta + \text{Sin inv}(\text{Sin } \delta\Theta1/\text{Cos } \Phi_1)$ and $\Phi_1 = \text{Sin inv}(\text{Cos } \delta\Theta1 \text{ Sin}(\Phi + \delta\Phi))$, where $H_{FOV}$ = Horizontal Field of View $V_{FOV} = 0.75 * H_{FOV}$ Vpixels = one half of the total number of vertical pixels Hpixels = one half of the total number of horizontal pixels $\Theta$ = azimuth angle of camera optic axis $\Phi$ = elevation angle of camera optic axis.

13. The article as claimed in claim 12, wherein selecting is done based on a priority.

14. The article as claimed in claim 9, wherein said translating pixel coordinates into absolute angular coordinates is done using a function having parameters comprising at least Horizontal Field of View, vertical pixels, horizontal pixels, and angles of camera optic axis.

15. The article as claimed in claim 9, wherein said translating absolute angular coordinates into pixel coordinates is done using a function having parameters comprising at least horizontal field of view, vertical pixels, horizontal pixels, and angles of camera optic axis.

16. An article of manufacture comprising:

a non-transitory computer usable medium having computer readable program code means embodied thereon for maintaining a privacy zone on a PTZ dome camera, said computer readable program code means in said article of manufacture comprising:

computer readable program code for locating an object to be masked on a camera display screen;

computer readable program code for superimposing a known rectangle for masking the object, said rectangle having four corners, each corner having pixel coordinates;

computer readable program code for translating each of the pixel coordinates into absolute angular coordinates;

computer readable program code for moving the camera and displaying a second camera view screen; and if the object is on the second camera view screen, computer readable program code for translating each of the absolute angular coordinates into pixel coordinates, creating a newly formed rectangle having the translated pixel coordinates, and displaying the newly formed rectangle to mask the object, wherein translating absolute angular coordinates into pixel coordinates comprises:

$X1 \text{ pixel} = (H\text{pixels}*(\text{Tan } \delta\Theta/\text{Tan } H_{FOV})) + X \text{ center offset}$ $Y1 \text{ pixel} = (V\text{pixels}*(\text{Tan } \delta\Phi/\text{Tan } V_{FOV})) + Y \text{ center offset}$, where $H_{FOV}$ = Horizontal Field of View $V_{FOV} = 0.75 * H_{FOV}$ Vpixels = one half of the total number of vertical pixels Hpixels = one half of the total number of horizontal pixels $\Theta$ = azimuth angle of camera optic axis $\Phi$ = elevation angle of camera optic axis.

17. An article of manufacture comprising:

a non-transitory computer usable medium having computer readable program code means embodied thereon for maintaining and displaying more than one privacy zone on a PTZ dome camera screen having four corners, said computer readable program code means in said article of manufacture comprising:

for each privacy zone, computer readable program code for determining a rectangle for masking an object, said rectangle having four corners, each corner having first pixel coordinates, and translating the first pixel coordinates into absolute angular coordinates;

computer readable program code for translating the four corners of the camera screen to angular coordinates;

for each privacy zone, computer readable program code for determining whether the privacy zone is on the camera screen, and if the privacy zone is on the camera screen, selecting no more than a number of maximum allowed privacy zones to be displayed; and for a number of privacy zones to be displayed, computer readable program code for translating each of the absolute angular coordinates into pixel coordinates, creating a newly formed rectangle having the translated pixel coordinates, and displaying the newly formed rectangle to mask the object, wherein translating absolute angular coordinates into pixel coordinates comprises:

$X1$ pixel=$(H\text{pixels}*(\text{Tan } \delta\Theta/\text{Tan } H_{FOV}))+X$ center offset $Y1$ pixel=$(V\text{pixels}*(\text{Tan } \delta\Phi/\text{Tan } V_{FOV}))+Y$ center offset, where $H_{FOV}$=Horizontal Field of View $V_{FOV}$=0.75*$H_{FOV}$ Vpixels=one half of the total number of vertical pixels Hpixels=one half of the total number of horizontal pixels $\Theta$=azimuth angle of camera optic axis $\Phi$=elevation angle of camera optic axis.

\* \* \* \* \*